Patented June 3, 1952

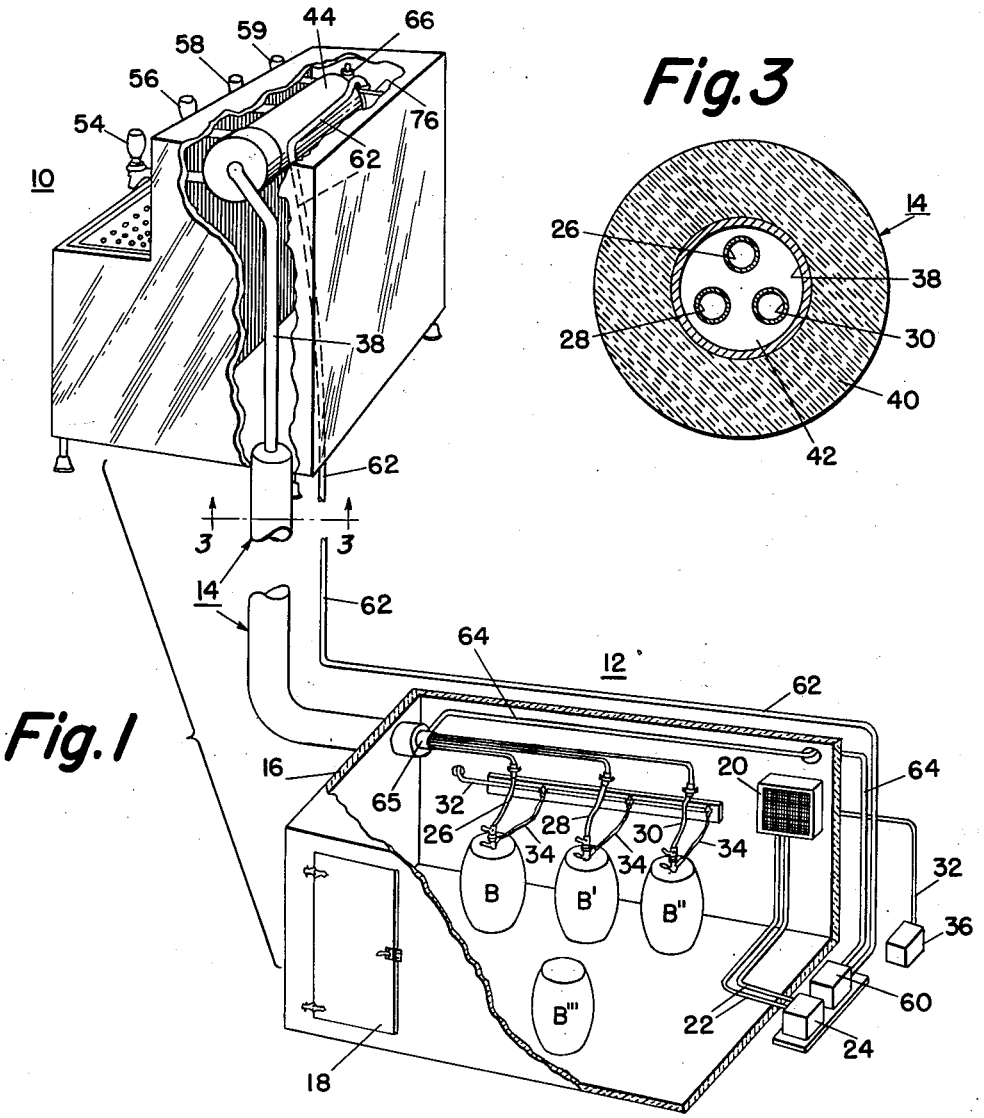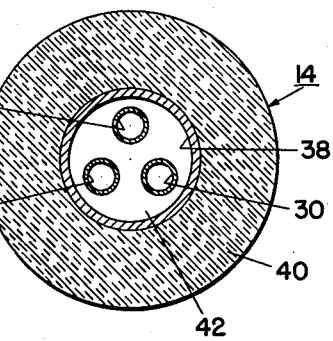

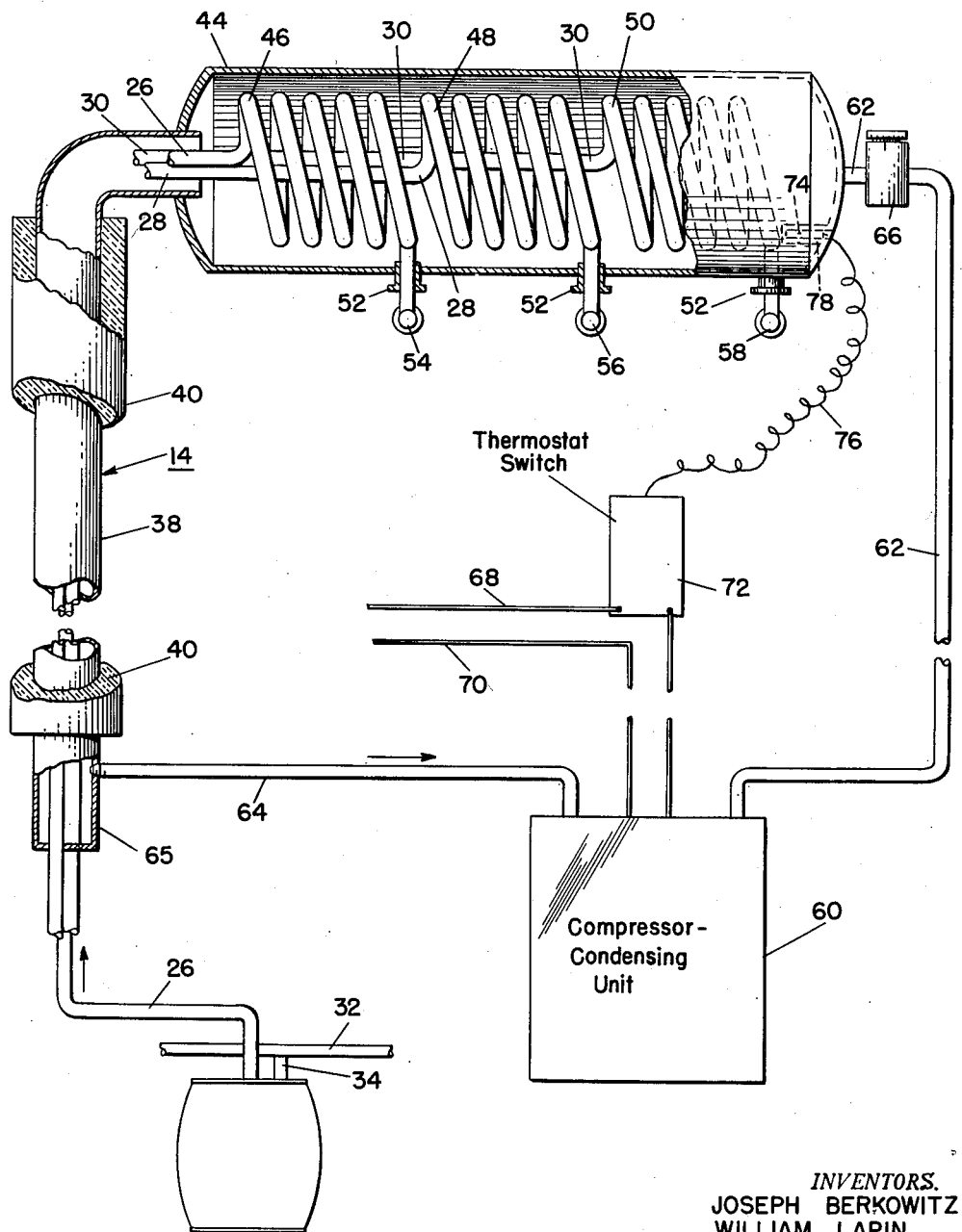

2,598,751

UNITED STATES PATENT OFFICE 2,598,751

ART OF COOLING AND DISPENSING BEVERAGES

Joseph Berkowitz, Philadelphia, Pa., and William Lapin, Los Angeles, Calif.

Application March 18, 1950, Serial No. 150,498

3 Claims. (Cl. 62—141)

1

The present invention relates to the art of cooling and dispensing beverages, and has particular reference to beer cooling and dispensing apparatus.

The apparatus of the invention in its essential details consists of a hermetically sealed tank, a liquid line from a compressor-condensing unit connected to said tank, an expansion valve near the juncture of said liquid line and tank, a hermetically sealed conduit also connected to said tank, a suction or return line from said conduit to said compressor-condensing unit, a beverage line encased by said conduit and extending into said tank, the free end of said beverage line extending through a wall of said tank, and being provided with a dispensing tap. The tank is preferably encased in a dispensing unit or cabinet of desired construction and design, and the source of beverage, e. g. barrels or kegs, may advantageously be housed in a storage chamber of the "walk-in" type, which is preferably cooled as by means of a diffuser or other refrigerating device.

In the presently-preferred embodiment, there are provided a plurality of beverage lines encased by the conduit and extending into the tank. The free ends of each of said beverage lines are formed into coils, the outer ends thereof extending through a wall of the tank and being provided with dispensing taps.

Brief reference will now be made to the drawing, wherein:

Figure 1 is a perspective view of the presently-preferred embodiment, partly broken away to reveal details of construction;

Figure 2 is a schematic illustration of the essential elements of the apparatus, omitting the cabinet and showing the flow of refrigerant and beverage; and Figure 3 is a cross-section through the conduit taken substantially on line 3—3 of Figure 1.

Referring to Figure 1 in greater detail, it will be seen that the numeral 10 indicates the dispensing unit generally, that 12 denotes the so-called "walk-in" type refrigerated storage room for the barrels or kegs of beer B, B', B'' and B''', and that 14 denotes the interconnecting conduit which encases the beer lines. The storage room, which consists essentially of an insulated chamber 16 having a suitable access door 18, may be located in a convenient part of the taproom or in the basement of the building. The room is advantageously and preferably cooled by means of a cold air diffuser 20. The specific structure of the diffuser does not constitute an essential part of the invention. The diffuser is shown connected

2 by means of pipes 22 to a refrigerant liquefier 24, which comprises a suitable form of compressor-condensing unit, and may be provided with a refrigeration or expansion coil, an expansion valve, a fan and motor (not shown).

The storage room is shown as containing four barrels or kegs of beer denoted by the letters B, B', B'' and B'''. The barrels B, B' and B'' are connected by means of beer lines 26, 28 and 30 respectively to the dispensing unit 10, as will hereinafter be described. These barrels are also connected to a compressed air line 32 by means of pipes 34. The compressed air is supplied by a suitable compressor 36 outside the storage room. Barrel B''' is a spare and is shown unconnected.

The beer lines 26, 28 and 30 are encased for the major portion of their lengths by the conduit 14. As shown in Figure 3, the conduit consists of a metal jacket 38, surrounded by a thick wall of suitable insulating material 40. The space 42 within the jacket serves as a return line for the refrigerant, as will later be described. The lower end of the conduit terminates within the "walk-in" storage room, and the upper end terminates within the dispensing unit 10. The pipe 38 is secured, as by welding, to one end of a hermetically sealed tank or distributor 44, which as shown in Figure 1, extends substantially the entire width of the dispensing unit in the upper portion thereof.

The beer lines 26, 28 and 30 extend into the tank or distributor 44, as shown in Figure 2, wherein they terminate in coils 46, 48 and 50 respectively, said coils being spaced longitudinally of the tank or distributor. The outer end of each of the coils is brought out of the tank through a bushing 52, the three bushings being substantially equally spaced along the width of the tank. Beer taps or faucets 54, 56 and 58 are secured to the ends of the coils 46, 48 and 50. A fourth tap 59, shown in Figure 1, may be provided for ice water or other beverage.

The reference numeral 60 denotes a second refrigerant liquefier, which comprises a compressor-condensing unit of any desired construction. The liquefier is connected by means of the liquid or compression line 62 to the end of the tank or distributor 44 opposite to the conduit or duct 14, and by means of the suction or return line 64 to the lower end 65 of the conduit or duct 14. It is to be noted that the end 65 of the conduit is hermetically sealed as is the upper end. An adjustable expansion valve 66 is shown connected to the liquid line 62 where it enters the tank or distributor 44.

As shown in Figure 2, electric current is supplied to the compressor-condensing unit by means of the wires 68 and 70. A thermostatic control 72 is provided in the line 68, said control having its temperature sensitive or "feeler" bulb 74 on the end of a capillary tube 76 inserted in a well 78 in the tank 44 in the vicinity of the compression line 62. This control operates to open the circuit to the compressor-condensing unit when the temperature in the tank falls a predetermined amount, and to close the circuit when the temperature rises.

It will be understood that when the circuit to the compressor-condensing unit is closed, the unit operates to liquefy a refrigerant, preferably Freon, and to force the liquefied refrigerant through line 62 and expansion valve 66 into the tank or distributor 44. The tank acts as an expansion chamber where the refrigerant expands into a vapor, absorbing heat, and returning through pipe 38 of conduit 14 and pipe 64 to compressor-condensing unit 60, thus completing the refrigeration cycle.

It will be further understood that the beer in the barrels in the storage chamber 12 is precooled to a temperature depending upon that of the cold air circulated by the diffuser 20, that the beer in the three barrels connected to the beer lines 26, 28 and 30 is forced by the pressure of the airline 32 upwardly through said beer lines into the coils 46, 48 and 50 and to the taps 54, 56 and 58. It is to be noted that the flow of beer through the conduit 14 and the tank 44 is opposite to that of the refrigerant, and that the refrigerant entirely surrounds the beer lines within the conduit and tank; also that the beer is finally cooled to the dispensing temperature in the coils 46, 48 and 50, said temperature depending upon the adjustment of the expansion valve 66.

The apparatus of the invention fulfills all the use requirements of beverage cooling and dispensing apparatus, and in addition is substantially free of the disadvantages usually associated with such apparatus. It is of considerably improved and simplified construction, can be installed much more readily and less expensively than other devices of the same kind, and requires considerably less attention, maintenance and servicing.

The beer is cooled gradually as it approaches the dispensing taps, thereby preventing shocking and discoloration of the beer. Nevertheless, the beer is cooled with exceeding rapidity, as can be seen from the fact that cold beer generally starts flowing in less than a minute after a barrel is connected to a beer line.

The apparatus is particularly flexible in operation; it can be set to dispense beverage at a desired temperature, and it is possible to draw as few or as many glasses at exactly the set temperature as may be desired.

The fact that the beverage lines are hermetically sealed results in a close control of the temperature from the barrel to the glass. Hence, the beer temperature is unaffected by outside conditions such as room temperature, and it is always possible to obtain a glass of beer with the original brewery flavor.

The foregoing disclosure was given by way of exemplifying the invention, and no unnecessary limitations are to be imported.

We claim:

1. A beverage cooling and dispensing apparatus comprising a hermetically sealed tank, a hermetically sealed conduit connected to said tank, a compressor-condensing unit, a liquid line connecting said unit to said tank, a return line connecting said conduit to said unit, an expansion valve connected to the liquid line near its juncture with the tank, a beverage line encased in said conduit and extending into said tank, the free end of said beverage line extending through a wall of said tank and being provided with a dispensing tap, and a thermostatic control for said compressor-condensing unit, said control being provided with a temperature sensitive bulb in said tank in the vicinity of the liquid line.

2. In combination with a dispensing cabinet, a beverage storage room and a compressor-condensing unit of a beverage cooling and dispensing apparatus, a hermetically sealed tank enclosed within said cabinet and extending the width thereof, a hermetically sealed conduit connecting said tank with said storage room, a liquid line connecting said compressor-condensing unit to said tank, a return line connecting said conduit to said unit, and at least one beverage line extending from said storage room through said conduit and into said tank, the free end of said beverage line extending through a wall of said tank and through a wall of said cabinet, and being provided with a dispensing tap.

3. In combination with a dispensing cabinet, a beverage storage room and a compressor-condensing unit of a beverage cooling and dispensing apparatus, a hermetically sealed tank enclosed within said cabinet and extending the width thereof, a hermetically sealed conduit connecting said tank with said storage room, a liquid line connecting said compressor-condensing unit to said tank, a return line connecting said conduit to said unit, at least one beverage line extending from said storage room through said conduit and into said tank, the free end of said beverage line extending through a wall of said tank and through a wall of said cabinet, and being provided with a dispensing tap, an expansion valve connected to the liquid line near its juncture with the tank, and a thermostatic control for said compressor-condensing unit, said control being provided with a temperature sensitive bulb in said tank in the vicinity of the liquid line.

JOSEPH BERKOWITZ.
WILLIAM LAPIN.

REFERENCES CITED

The following references are of record in the file of this patent:

UNITED STATES PATENTS

| Number | Name | Date |
|---|---|---|
| 1,964,643 | Fuchs et al. | Aug. 7, 1934 |
| 2,009,623 | Killen | July 30, 1935 |
| 2,153,335 | Martin | Apr. 4, 1939 |
| 2,316,376 | Weiss | Apr. 13, 1943 |
| 2,327,910 | Levine | Aug. 24, 1943 |
| 2,447,769 | Pringey | Aug. 24, 1948 |
| 2,485,610 | Kramer | Oct. 25, 1949 |